Feb. 13, 1968  J. J. WATSON  3,368,661
CASTINGS COOLING CONVEYOR SYSTEM
Filed May 9, 1966  5 Sheets-Sheet 1
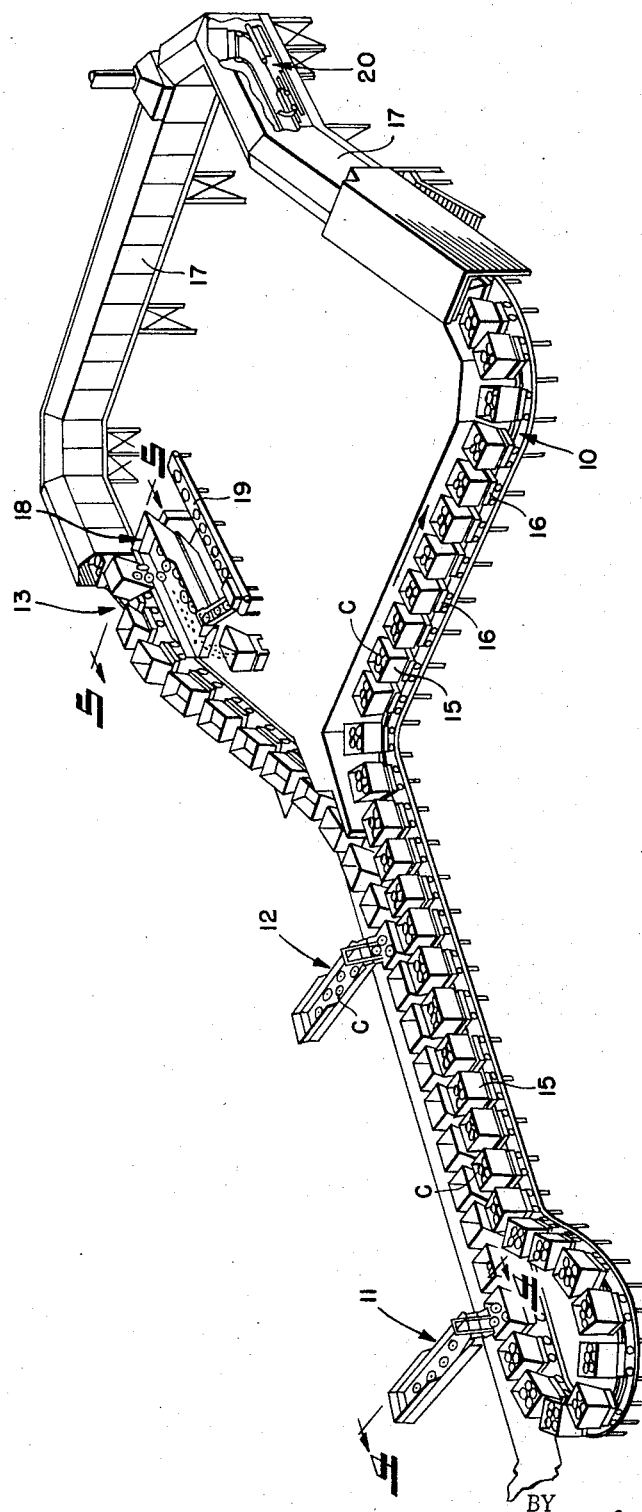
INVENTOR
JOHN J. WATSON
BY Oberlin, Maky & Donnelly
ATTORNEYS

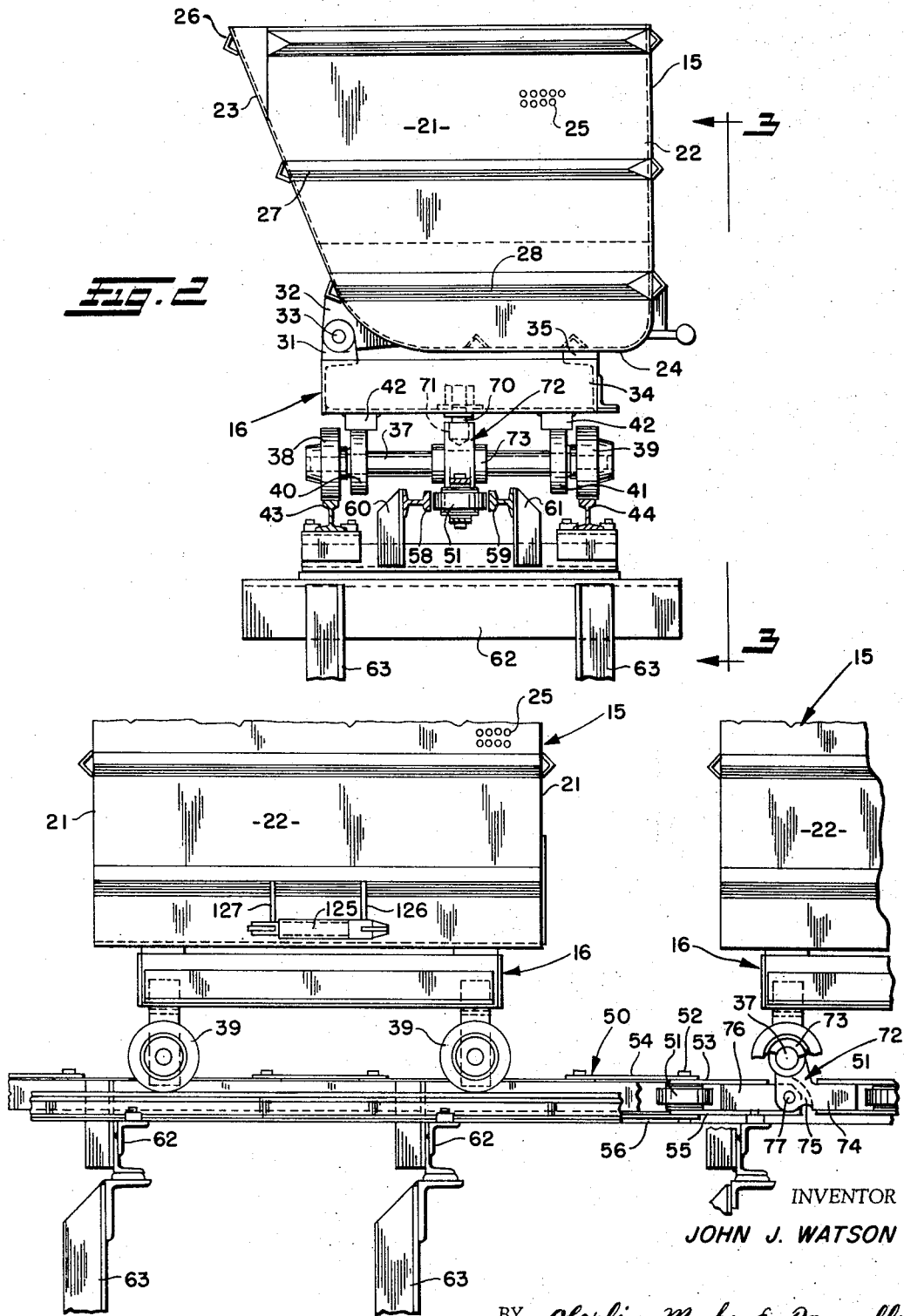

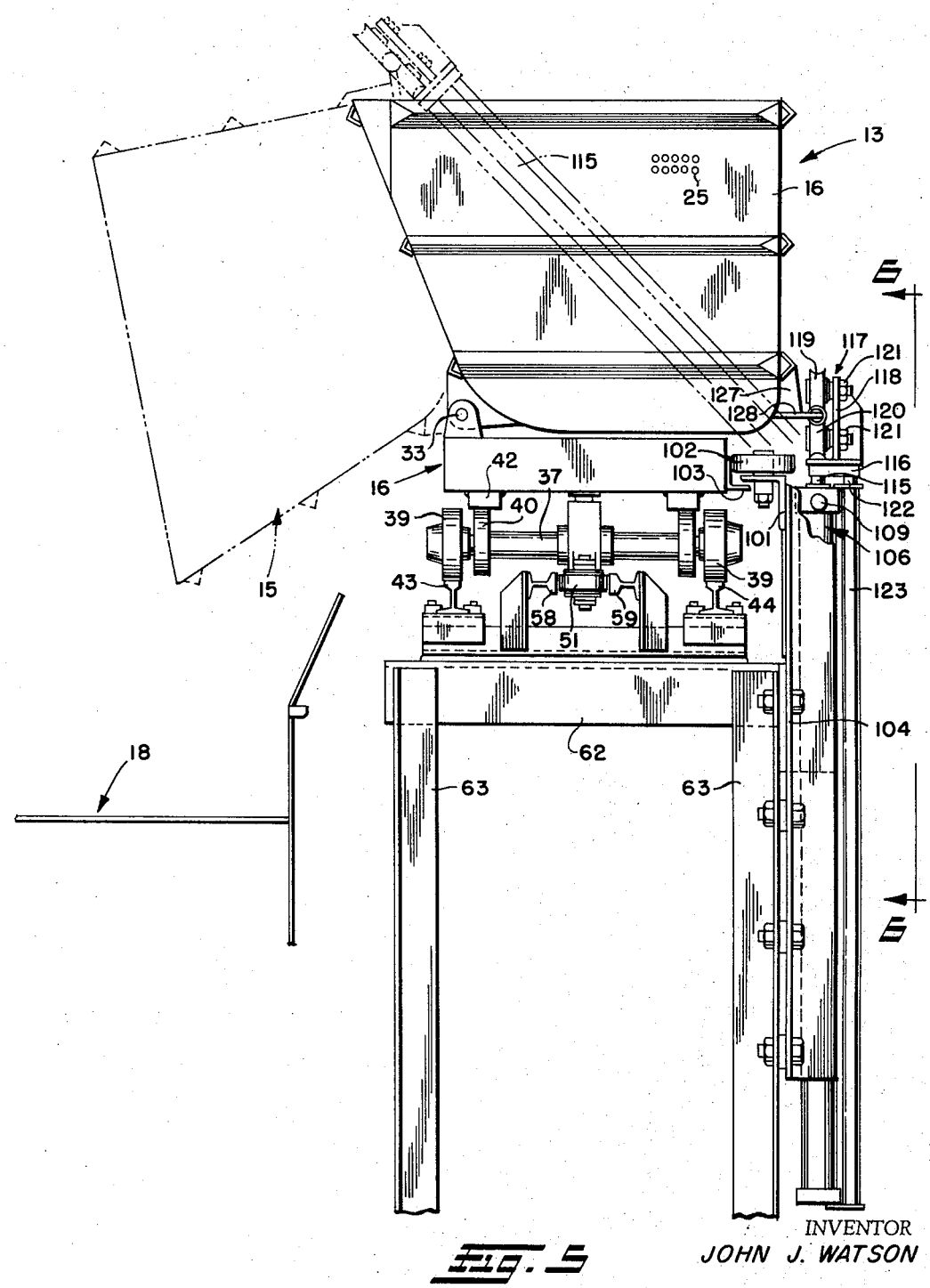

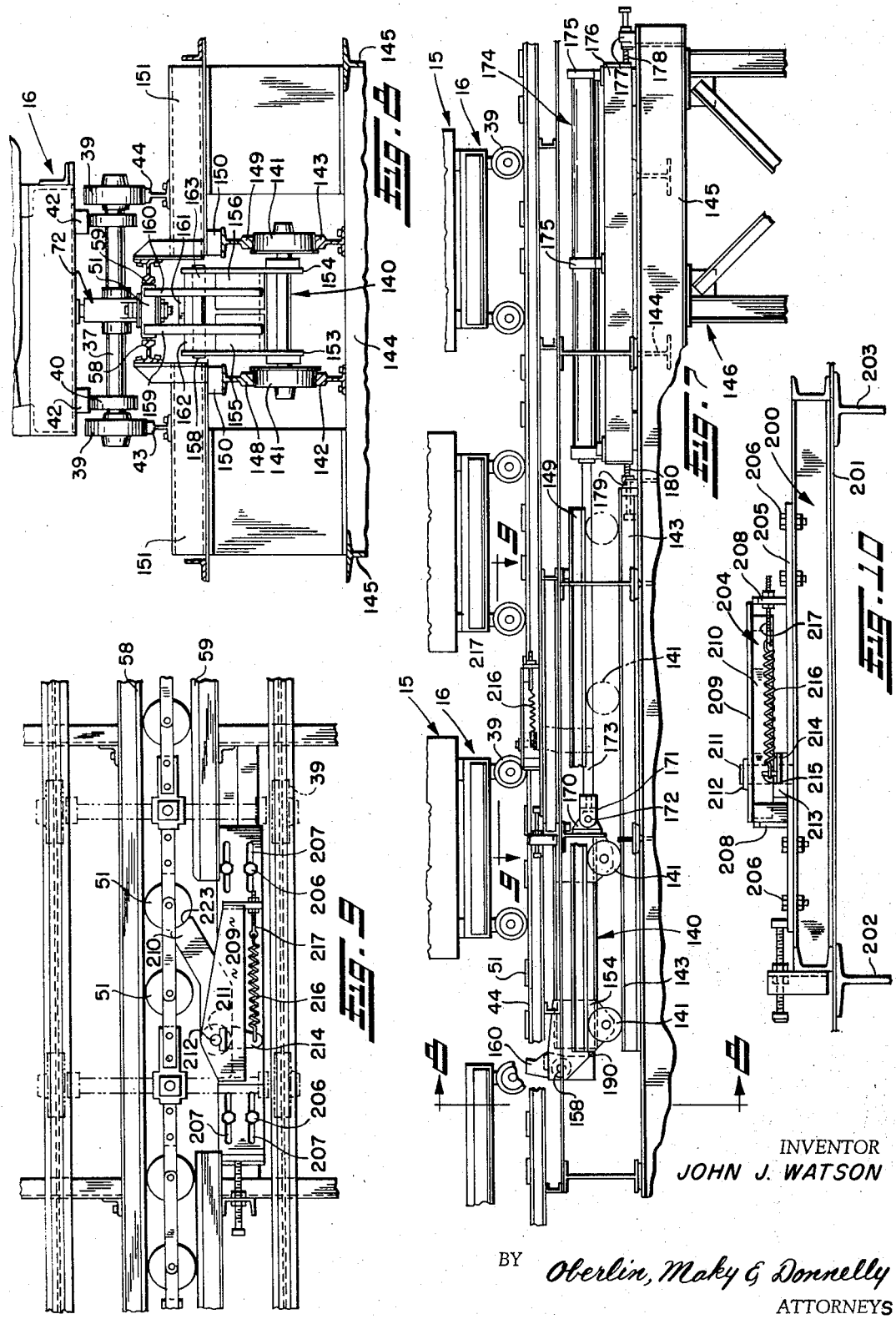

United States Patent Office 3,368,661
Patented Feb. 13, 1968

3,368,661
CASTINGS COOLING CONVEYOR SYSTEM
John J. Watson, North Olmstead, Ohio, assignor to Bartlett-Snow-Pacific, Inc., Cleveland, Ohio, a corporation of California
Filed May 9, 1966, Ser. No. 548,789
2 Claims. (Cl. 198—145)

ABSTRACT OF THE DISCLOSURE

A castings cooling conveyor system wherein the castings to be cooled are carried by open-top buckets pivotally mounted on predeterminedly spaced conveyor cars, the drive means for indexing said cars being in timed relation with said castings loading and dump stations whereby said buckets are loaded and dumped while stationary.

*Disclosure*

The present invention relates as indicated to a castings cooling conveyor system and more particularly to a novel method of and apparatus for cooling castings produced in foundry operations.

Prior systems for cooling castings from the shakeout zone or zones have not been satisfactory for a number of reasons. A typical such system comprises an overhead or suspended conveyor installation in which the castings are carried on hooks, carriers, trays or the like supported by the overhead conveyor, with the conveyor traversing a predetermined path for the requisite time to cool the castings to permit further handling thereof. Such system requires the manual handling of the castings thereby exposing the operators to the relatively high heat and hazardous fume conditions. Moreover, specifically designed trays or carriers are often required to handle castings of a specific size or shape. Further, in overhead installations of the continuous conveyor type, the loading and unloading of the castings poses a considerable problem and this arrangement is as a result relatively inflexible. For example, with a continuous conveyor, the faster the conveyor speed the shorter the loading and unloading time, with any modification in the system to provide a longer loading time being necessarily with a sacrifice to conveyor speed. In addition, the continuous conveyor type system requires relatively greater length to permit the desired cooling of the castings.

In present overhead conveyor systems having indexing movement, that is, intermittent controlled movement of the entire conveyor, there is a tendency for the casting carriers supported by the overhead conveyor to undesirably sway or rock during starting and stopping, thereby substantially increasing the spillage problems.

With the above in mind, a primary object of the present invention is to provide a castings cooling conveyor system which is fully automatic and which is inherently flexible to accommodate castings having varying cooling times.

A more specific object of the present invention is to provide such a conveyor system in which the castings and sprues from the shakeout deck are loaded into open-top buckets pivotally mounted on and carried by transfer cars operatively connected to the loop conveyor, with the buckets being constructed and arranged conveniently to receive the castings and sprues from the shakeout deck and to transport the same while cooling, substantially without spillage of castings or sand therefrom.

Another object of the present invention is to provide such a conveyor system in which the movement of the conveyor is indexed thereby to permit loading and unloading of the castings when the bucket is stationary, with both the loading and discharging of the castings and sprues being in timed relation to the indexing of the conveyor to automatically effect such loading and discharging only when buckets are in position at such respective stations.

Yet another object of the present invention is to provide a conveyor system in which such buckets are constructed and arranged on the conveyor so as to preclude inadvertent pivoting or tipping thereof en route to the discharge or dump station, with such buckets cooperating with actuating equipment at such dump station to pivot or rock the same to a position in which the castings are dumped by gravity from the buckets to a further shakeout station for separating the castings and sprues.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a schematic perspective view of the castings cooling conveyor system of the invention;

FIG. 2 is an end elevational view, partly in section, of the bucket and transfer car, showing the manner in which the latter is supported on the drive conveyor;

FIG. 3 is a side elevational view taken on line 3—3 of FIG. 2;

FIG. 5 is a side elevational view of the dump station taken on line 5—5 of FIG. 1;

FIG. 7 is a side elevational view of the indexing drive mechanism for intermittently moving the chain conveyor and the buckets carried thereby;

FIG. 8 is a sectional view taken on line 8—8 of FIG. 7;

FIG. 9 is a sectional view taken on line 9—9 of FIG. 7, and

FIG. 10 is an enlarged, side elevational view of the pawl assembly for preventing retrograde movement of the indexing conveyor.

Figure 4:
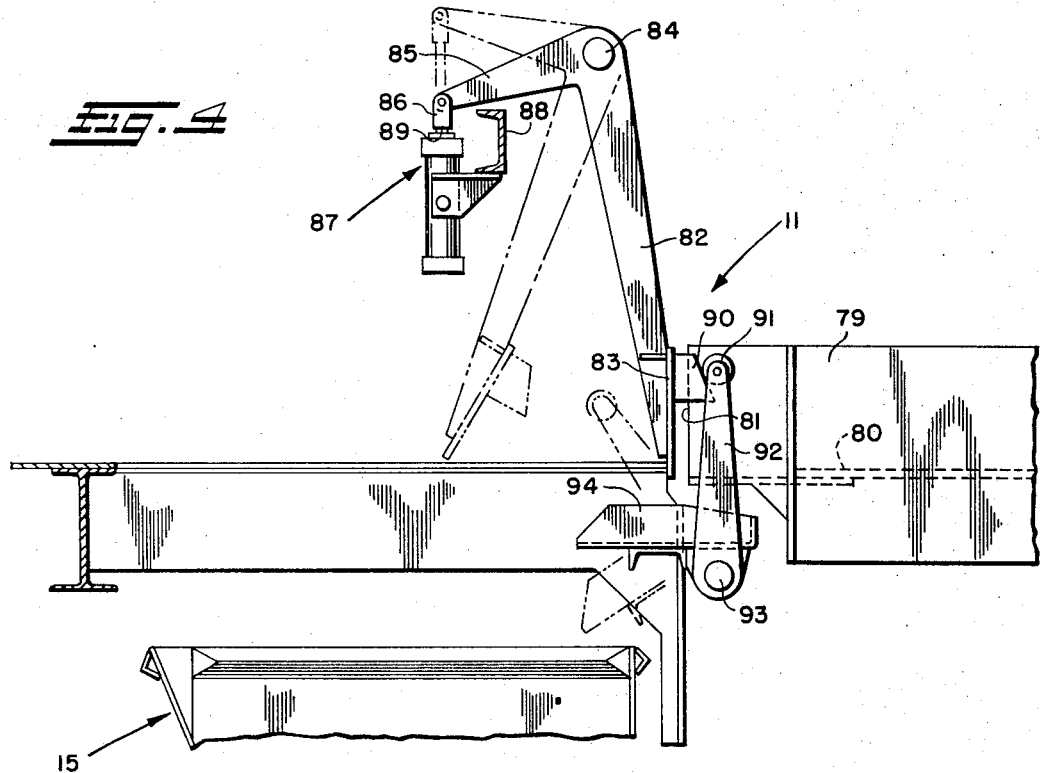
FIG. 4 is a fragmentary, side elevational view of the loading station, with the bucket being shown fragmentarily and in position to receive the castings and sprues.

It should be noted at the outset that the invention here concerned relates to the handling of castings and sprues after being processed through the shakeout zone at which the same are separated from the sand. The mold and pouring operations prior to shakeout form no part of the present invention and accordingly have not been illustrated. At the shakeout station, the castings will typically be in the temperature range of 1200°–1400° F. and will be cooled in accordance with the present invention to 100°–200° F. for further handling. These temperatures are merely typical and not in any way intended to be limiting, with such temperatures and the cooling time required to reduce the castings to the indicated temperature varying greatly with the shape and thickness of the castings.

Referring now to the schematic plan view of the system as shown in FIG. 1, the indexing drive conveyor is generally indicated at 10 and extends continuously around the entire system. Shakeout zones generally indicated at 11 and 12 are disposed adjacent one side of the conveyor run and the castings dump station is generally indicated at 13. The direction of movement of the indexing conveyor is indicated by the directional arrow and the castings C are discharged at the shakeout stations into buckets 15 mounted on conveyor cars generally indicated at 16 which are carried by the indexing conveyor 10 in a manner to be described.

In the form shown, one end of the conveyor run is relatively elevated and a housing 17 is provided to form a wind tunnel through which air can be directed for facilitating the cooling operation. At the dump station, the castings are discharged to a shakeout station generally indicated at 18 whereat the castings are separated from the sprues, with the castings being removed from the system by means of conveyor belt 19. The empty buckets are then indexed back to shakeout zones for completion of the circuit.

The drive means for the indexing conveyor is generally indicated at 20 and will be described in more detail hereinbelow when particular reference is made to FIGS. 7–10.

It will be understood that although two shakeout zones 11 and 12 are illustrated, one, or more than two, may be provided as well to accommodate a particular installation. It will be seen that the buckets loaded with castings at shakeout zone 12 will traverse a longer cooling path than the castings loaded at shakeout zone 11, and in this manner the castings cooling period can be effectively regulated by variably locating the shakeout zone or zones relative to the dump station 13. The cooling time is additionally controlled by the indexing speed of the conveyor, with the capacity of the system being controlled by the length of the conveyor run and the spacing of the conveyor cars 16.

Referring to FIGS. 2 and 3, each bucket 15 is preferably formed of steel plate and comprises sides 21, a back 22, an outwardly inclined front 23, and a bottom 24. The sides and end of the bucket are preferably perforated as indicated at 25 for facilitating cooling of the castings. Circumferentially extending reinforcing ribs 26, 27 and 28 are provided in vertically spaced relation on the exterior of the bucket for rigidifying the same.

Each conveyor car 16 is of rugged plate and channel steel construction suitably to withstand the weight transmitted therethrough from the bucket to the conveyor rails. Pivot blocks 31 extend upwardly from the conveyor car adjacent one end thereof and are provided with apertures adapted to be aligned with apertures formed in brackets 32 mounted on the bucket and extending laterally thereof relatively adjacent the bottom of the same. Pivot pins 33 extend through the aligned openings for completing the pivotal connection. A bumper plate 35 is mounted on the car 16 for contacting and supporting the adjacent end of the bucket when the same is in its erect, FIG. 2 position.

A shaft 37 extends transversely of the car and has mounted on the opposite, reduced ends thereof rollers 38 and 39. An identical shaft and roller arrangement is provided at the front end of the car thereby to support the car for rolling movement at each corner thereof. Mounted on shaft 37 immediately inwardly of each roller 38 and 39 are rollers 40 and 41, respectively, which are vertically aligned with blocks commonly designated at 42 mounted on the bottom wall of the car, with the additional rollers serving better to distribute the relatively heavy loads to the rails 43 and 44 which support the rollers 38 and 39.

Still referring to FIGS. 2 and 3, each conveyor car 16 and bucket 15 carried thereby is movable with drive conveyor 10 which is preferably of the commercially available universal chain type. The conveyor comprises a plurality of spaced chain rollers commonly designated at 51 mounted in a conventional manner on rollers pins 52 extending through spaced conveyor plates 53–56. The rollers 51 are movable between rails 58 and 59 which are carried by upstanding frame members 60 and 61 which are in turn mounted on transverse plates commonly designated at 62 supported by frame members 63.

The conveyor cars 16 are operatively connected to the drive conveyor 10 in the following manner. Each car 16 carries relatively adjacent the front and rear ends thereof a downwardly depending pin 70 which is adapted to be received in an opening 71 formed therefor in a generally L-shaped coupling member generally indicated at 72. The latter includes a central hub portion 73 through which the shaft 37 extends. The coupling 72 further includes a bottom leg portion 74 and a reduced corner section 75 which is adapted to extend within an opening provided therefor formed in the forward end of connecting member 76, with these members being pinned as indicated at 77 to provide the desired connection. The conveyor cars 16 are thus operatively connected to the universal chain conveyor and are movable therewith, with the chain conveyor being adapted to be moved through predetermined increments of travel by means to be hereinafter described.

Referring now to FIG. 4, there is illustrated therein the preferred arrangement for loading the buckets 15 at the shakeout zones 11 or 12. The castings and sprues (not shown) following separation from the mold sand are delivered by the shakeout 79 and shakeout deck 80 from which they are loaded through a control device into the bucket 15 when the same has been accurately positioned therebelow.

The shakeout 79 has an open front end 81 with the castings between the loading periods being retained on the shakeout by gate member 82 the lowermost end 83 of which extends downwardly generally coextensive with the open front 81 of the shakeout. The gate 82 is generally L-shaped and is mounted for pivotal movement about pin 84. The top leg 85 of the gate member is pivotally attached at its free end to clevis 86 of a piston-cylinder device generally indicated at 87 which is carried by channel beam 88. As shown in dashed lines in FIG. 4, when the piston-cylinder device is actuated, the piston rod 89 pivots the gate 82 about the pivot pin 84 thereby moving the lower end 83 of the gate away from the open front end 81 of the shakeout 79 to permit castings to be discharged into the bucket.

The gate member 82 carries the cam plate 90 which is adapted to engage a cam roller 91 mounted at the upper end of an arm 92. The lower end of such arms is mounted on shaft 93 which also carries a shelf member 94.

Owing to the particular position of the shaft 93, the shelf 94, when the arm 92 is unobstructed, will drop due to gravity with the shelf 94 forming an effective chute for guiding the castings from the shakeout 79 into the bucket 15. When the gate member 82 is moved to its closed position shown in solid lines in FIG. 4, the cam plate 90 will engage the cam roller 91 and force the arm 92 and thus the shelf 94 to the solid-line position thereof as shown in FIG. 4.

In the operation at the shakeout station, when a bucket 15 has been positioned at the station through controlled indexing of the conveyor, the piston-cylinder device 87 will be actuated and the gate member 82 will as a result be moved away from the open end of the shakeout deck 80 with the shelf 94 being simultaneously dropped to its dashed-line, FIG. 4 position. The castings will discharge directly from the shakeout deck 80 into the bucket 15 for a controlled period of time at the end of which the piston-cylinder device 87 will be actuated to retract the piston rod 89 and return the gate 82 to its solid-line, FIG. 4 position thereby shutting off the flow of castings and sprues from the shakeout deck. On signal that the gate 82 has been moved to such closing position, the conveyor will be moved one car length thereby positioning the succeeding bucket at the loading station. When the succeeding bucket 15 is in such position, which can be detected by a limit switch signal or the like forming part of the indexing drive mechanism for the conveyor, the piston-cylinder device 87 will again be actuated as described to discharge castings into the bucket.

Figure 6:
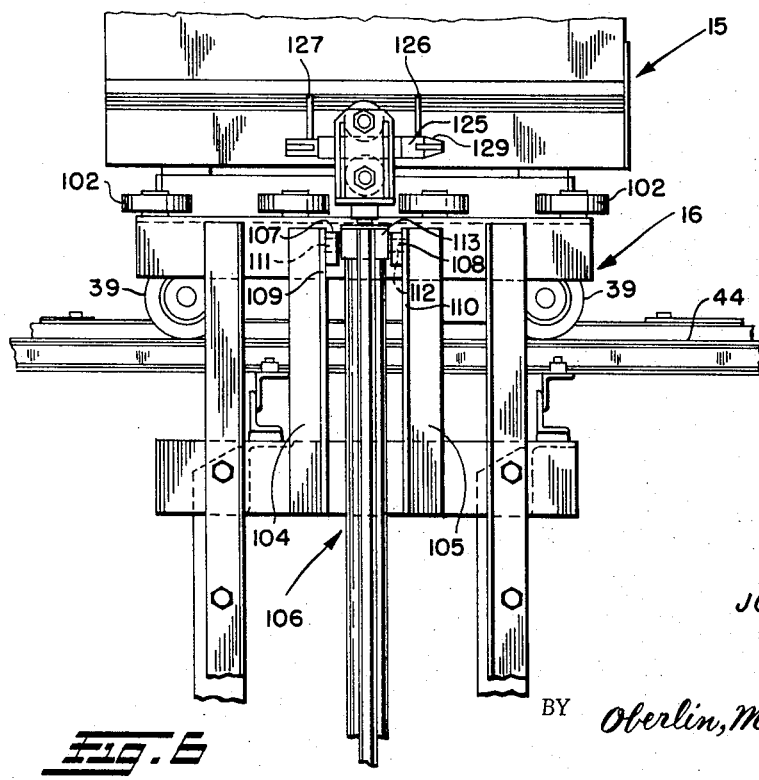
FIG. 6 is a partially fragmentary end elevational view taken on lines 6—6 of FIG. 5.

Referring now to FIGS. 5 and 6, there is illustrated therein the means by which the bucket 15 is pivoted at the dump station 13 to discharge the castings to the shakeout station 18, shown schematically in FIG. 1. The dump station 13 includes an L-shaped frame plate 101 carried by the framing structure, with the top leg of plate 101 mounting a plurality of guide rollers commonly designated at 102, there being four such rollers in the form shown, referring to FIG. 6. The rollers 102 are adapted to engage and guide the car 16 while simultaneously maintaining the same in a substantially horizontal position while the bucket pivotally attached thereto is being dumped.

To further insure that the car 16 remains in such horizontal position during dumping, the car is provided with an L-shaped flange 103 the bottom leg of which extends beneath the top leg of the plate 101 thereby to limit the relative movement of the car relative to the stationary frame assembly. Angle members 104 and 105 carried by the framing structure and extending downwardly from the plate 101 are spaced to receive therebetween a hydraulic cylinder assembly generally indicated at 106. Bearing supports 107 and 108 are carried by the rearwardly extending side flanges 109 and 110 of the members 104 and 105, with the supports 107 and 108 receiving pins 111 and 112 loosely received in collar 113 attached to the upper end of the cylinder 106. In this manner, the entire cylinder assembly is free to rotate about the axis through the pins 111 and 112, as shown in dashed lines in FIG. 5, during the dumping of the bucket.

The piston rod 115 of the cylinder 106 is operatively connected to the plate 116 of a guide roller assembly generally indicated at 117. The latter further include a vertical plate 118 which pivotally carries concave rollers 119 and 120, with the mounting pins for such rollers extending through openings in the plate 118 and being secured in place by nut members 121. Also attached to the bottom plate 116 is the rod 122 of an auxiliary guide assembly 123 the bottom end of which is connected to the bottom of the cylinder 106. The auxiliary guide assembly 123 functions to stabilize the guide roller assembly during actuation thereof.

As best shown in FIG. 6, a tubular shaped aligning member 125 is supported in laterally extending position from the bucket 15 by laterally extending brackets 126 and 127 and a bottom bracket 128, FIG. 5. The diameter of the tubular member 125 is slightly less than the distance between the adjacent concave surfaces of the rollers 119 and 120 whereby the latter receive the tubular member when the bucket 15 is delivered to the dump station 13. To facilitate entry of the tubular member between such rollers, the member is formed with a tapered forward end portion 129.

The dumping operation is effected in the following manner. When the conveyor car 16 and bucket carried thereby have been moved into position at the dump station, the cylinder 106 is actuated whereby the piston rod 115 thereof is extended thereby extending the guide roller assembly 117. Simultaneously, the cylinder 106 is pivoted about pins 111 and 112, with the piston rod 115 and guide roller assembly 117 traveling through an arc about the previously described pivot pin 33 which pivotally connects the bucket 15 to the car 16. The stroke of the cylinder 106 is controlled to rotate the bucket 15 to the position shown in dashed lines in FIG. 5 thereby to insure the dumping of the castings from the bucket into the shakeout zone 18. Following such dumping, the cylinder 106 is actuated to retract the rod 115 and thereby return the bucket to its solid-line, FIG. 5, position to permit subsequent indexing of the drive conveyor to deliver a succeeding bucket to the dump station.

Referring now to FIGS. 7-9, there is illustrated therein the indexing drive mechanism for indexing the conveyor through predetermined increments of lengths thereby to advance the conveyor cars through periodic movements of predetermined distances. A dog carriage generally indicated at 140 is mounted for reciprocal movement beneath the rails 43 and 44 supporting the transfer cars 16.

The carriage 140 is provided with rollers commonly designated at 141 at each corner thereof which are adapted to engage and can be supported by rails 142 and 143. The latter can be supported in any suitable manner such as, for example, by transverse beams 144 in turn connected to I-beams commonly designated at 145, with the latter being supported by frame members generally indicated at 146.

An upper set of rails 148 and 149 is disposed vertically directly above the rails 142 and 143 and slightly spaced from the rollers 141, with the rails 142, 143, 148 and 149 effectively forming a guide channel for controlled longitudinal movement of the dog carriage 140. The upper rails 148 and 149 can be supported in any suitable manner such as, for example, by support beams 150 carried in turn by the transversely extending beams 151 which are ultimately supported by the framing 146. It will thus be seen that the dog carriage 140 is confined in its travel between the respective pairs of vertically spaced rails, with the carriage in the form shown being movable between its dotted and dashed line positions shown in FIG. 7.

The dog carriage 140 comprises longitudinally extending side plates 153 and 154 which are suitably spaced throughout by transverse frame members 155 and 156. As seen in FIG. 7, the side plates 153 and 154 are somewhat enlarged in the rear portions thereof, with the shaft 158 extending between the side plates in such region and being journaled in aligned openings formed therein. A pair of dog members 159 and 160 are rotatably carried on shaft 158, with the upper ends of the dog members extending upwardly into the plane of the conveyor rollers 51. The dog members are suitably spaced by a connecting bracket 161 with the thus formed dog member assembly being centrally spaced on a shaft 158 by spacing sleeves 162 and 163. As clearly seen in FIG. 8, the upper ends of the dog members 159 and 160 both engage the adjacent conveyor roller 51 and function as the means by which the transfer cars are advanced when the dog carriage is reciprocated, as will be presently described.

The dog carriage relatively adjacent the forward end thereof is provided with a tongue 170 which is pinned to clevis 171 through pin 172, with the clevis in turn being carried by piston rod 173 of an indexing cylinder generally indicated at 174. The latter is mounted in blocks commonly designated at 175 supported on a housing 176 which is in turn mounted for adjustment on beams 144 carried by the frame structure 146. An adjusting mechanism 177 including a set screw 178 is carried by the beam 144 at the forward end of the indexing cylinder 174, and a similar such adjusting mechanism 179 is mounted on the beam 144 at the opposite end of the housing 176 with the adjusting screw 180 thereof contacting the adjacent end of the housing. It will thus be seen that by suitable adjustment of the set screws 178 and 180, the housing 176 is adjustable longitudinally on the beams 144 thereby to accurately position the indexing cylinder 174, with suitable means (not shown) being provided to clamp the housing 176 in such adjusted position.

In the operation of the dog carriage 140 as thus far described, actuation of the indexing cylinder 174 functions to reciprocate the carriage between the solid and dashed lines of FIG. 7. In the solid-line position, the dog members 159, 160 extend upwardly behind the adjacent conveyor rollers 51, and when the cylinder 174 is actuated to retract the piston rod 173, the dog members 159 and 160 will engage such roller and move the conveyor to the right as viewed in FIG. 7. It should be noted that the dog members 159 and 160 by virtue of their center of gravity and pivotal mounting hang substantially vertically and are prevented from rotating in a counterclockwise direction during indexing of the conveyor, again referring to the FIG. 7 orientation of these members, by a stop 190 which extends between the side plates 153 and 154. During return of the dog carriage subsequent to the indexing operation to its solid-line position thereof as shown in FIG. 7, the dog members 159 and 160 are rotated by the conveyor rollers 51 about the axis of the shaft 158 thereby to clear the rollers so as not to impair the return movement of the dog carriage. It will be understood that positive means, for example a leaf spring or the like, could be employed to bias the dog members 159 and 160 being pivoted during the return movement of the carriage against the bias of such spring to clear the conveyor rollers 51.

Means are mounted on the frame structure above the carriage 140 for preventing retrograde movement of the indexing conveyor during return of the dog carriage preparatory to a subsequent indexing operation. As perhaps best shown in FIGS. 9 and 10, a frame assembly generally indicated at 200 is mounted on base 201 which is in turn mounted on I-beams 202 and 203 ultimately supported by the framing structure 146. A pawl assembly generally indicated at 204 and including a base member 205 is carried by the frame 200 and can be mounted thereon preferably for adjustment by any suitable means such as, for example, clamp bolts 206 which extend through elongated slots 207 formed in the base for longitudinally adjusting the pawl assembly 204.

The pawl assembly 204 further includes end plates 208 and a top plate 209 which are interconnected with the base plate 205 to form a unitary assembly. As best shown in FIG. 9, a pawl arm 210 is mounted on pin 211 which extends through the top plate 209 and the base plate 205 and is retained in place by a retainer member 212 which extends into a groove formed therefor in the pin. The bottom of the pawl arm 210 is vertically spaced from the base 205 by a spacer block 213.

An arm 214 extends laterally from the spacing block 213 and carries an upstanding pin 215 around which extends the adjacent end of a coil spring 216. The opposite end of the coil spring 216 extends through the head of an eyebolt 217 which is threaded in the end plate 208. The spring 216 thus serves to bias the pawl arm 210 toward the rollers 51, with the pivotal movement of the pawl arm in such direction being limited by the adjacency of the rear end of the pawl arm to the end plate 208.

As seen in FIG. 9, the forward end 223 of the pawl arm 210 is curved to approximately the curvature of the conveyor rollers 51, and during the indexing operation, the pawl arm 210 will be rotated clockwise, as seen in this figure, about the axis of pin 211 as the several conveyor rollers 51 travel to the right during the indexing operation. The movement of the pawl arm by the indexing rollers will be against the bias of the coil spring 216. When the conveyor has been indexed the controlled distance, as regulated by the stroke of the indexing cylinder 174, the spring 216 will bias the pawl arm 210 to the position thereof illustrated in FIG. 9 whereat the forward curved end 223 of the pawl arm engages the then adjacent conveyor rollers 51. In this manner, retrograde movement of the conveyor is positively prevented during the return of the dog carriage 140 prior to the next indexing operation. When the dog carriage 140 is advanced during the succeeding indexing stroke, the pawl arm 210 will again be cammed out of the way by the several conveyor rollers 51 in the manner described until the indexing stroke has been completed.

The controlling of the indexing movement by the stroke of the indexing cylinder 174 coupled with the longitudinal adjustability of the housing 176 serve to provide an accurately indexed advance of the conveyor and transfer cars 16 and buckets 15 carried thereby. The frequency of actuation of the cylinder 174 and thus the indexing movement of the transfer cars 16 is preferably controlled by an automatic timer forming part of a control system which coordinates movement of the conveyor and the operations at the various stations. As above noted, the loading of the castings into the buckets at the shakeout zone or zones is preferably controlled by a signal indicating that the transfer car is in proper position at such station. Similarly, as described, the dumping of the castings following cooling thereof at the dump station is conditioned upon the proper positioning of the transfer car and bucket at the dump station. Suitable control means, for example a limit switch operatively connected to the indexing cylinder, can be employed to signal the termination of the indexing to permit loading and dumping of the buckets positioned respectively at the shakeout and dump stations.

The advantages provided by the system of the present invention when compared with castings cooling systems of the type previously known are numerous and significant. The system is completely automatic in operation thereby avoiding the subjecting of foundry personnel to hazardous heat, dust and fumes. The system is, moreover, highly flexible in that the two or more shakeout zones can be located practically at random along the conveyor course, as long as they are positioned at a multiple of the distance per indexing advance of the conveyor as controlled by the indexing cylinder.

The use of the open-top buckets for receiving and retaining the castings during the cooling operation has many advantages. Initially, the entire top area of the bucket is exposed to permit convenient loading thereof. Moreover, the bucket prevents the spilling of castings or sand while the castings are being cooled during traversal of the conveyor course. The castings cannot fall out of the bucket due to the manner in which the latter is pivotally mounted on the transfer car, which provides an inherent safety feature in the system. Moreover, the bucket handling of the castings eliminates the use of special fixtures, trays, carriers, hooks, or the like to handle castings of specific design, as heretofore required, for example, in overhead conveyor systems. The bucket and transfer car arrangement of the present invention also facilitates enclosing the conveyor run to accomplish accelerated cooling, with such cooling being effected with minimum amounts of air being required.

The indexing movement of the conveyor in conjunction with the bucket-type containers enables the required floor space to be substantially minimized since the conveyor length can be reduced owing to the intermittent movement of the conveyor. Further, since the buckets are stationary at the loading and dump stations, the loading and discharging of the castings is greatly facilitated and capable of convenient regulation. Moreover, the buckets substantially eliminate the problem of swaying and bumping of carriers or trays during the indexing operation, as with suspended or overhead types of castings cooling conveyor systems.

Another important feature of the invention resides in the ability to maintain a predetermined loading time while simultaneously varying the cooling time by varying the timing of the indexed movements of the drive conveyor. If a relatively longer cooling time is required for a given number of conveyor cars, the period between indexing, preferably controlled by a timer embodied in the control system, can be increased, thereby increasing the total traverse time of each bucket between loading and dumping. The varying of the interval between indexing movements in no way affects the loading or dumping periods, which can remain fixed. In addition, the capacity of the system can be increased or decreased by varying the conveyor loop, similarly without affect on the loading or dumping periods in any way.

Obvious minor variations from the disclosed system will suggest themselves to those skilled in the art without, however, departing from the spirit of the present invention. For example, the shape and spacing of the buckets and the contour of the conveyor course could be varied to adapt to a particular installation. The shakeout zones could be more numerous than those illustrated and could be randomly spaced around the conveyor course to accommodate a particular castings cooling period.

Other modes of applying the principle of the invention may be employed, change being made as regards the details described, provided the features stated in any of the following claims or the equivalent of such be employed.

I therefore particularly point out and distinctly claim as my invention:

1. A castings cooling conveyor system comprising a closed loop conveyor, drive means for moving said conveyor through indexed movements each of a predetermined distance, a plurality of conveyor cars mounted on and carried above said conveyor in predetermined spaced relation, an open-top bucket pivotally mounted on each of said cars relatively adjacent one side thereof, means for loading castings into said buckets while said buckets are stationary, said conveyor drive means subsequent to such loading moving said conveyor and said buckets over a predetermined part of said conveyor loop for cooling said castings prior to movement to a dump station, said bucket being provided with means disposed generally opposite said pivotal mounting adapted to be engaged by power means located at said dump station for dumping said buckets, said power means comprising piston-cylinder means, including a pair of rollers between which an aligning means carried by said bucket is adapted to pass to align said bucket at said dump station, the piston of said piston-cylinder means acting through said aligning means to effect pivoting of said bucket about the pivotal connection thereof with said car.

2. A castings cooling conveyor system comprising a closed loop conveyor, drive means for moving said conveyor through indexed movements each of a predetermined distance, a plurality of conveyor cars mounted on and carried above said conveyor in predetermined spaced relation, an open-top bucket pivotally mounted on each of said cars, means for loading castings into said buckets while said buckets are stationary, said conveyor drive means subsequent to such loading moving said conveyor and said buckets over a predetermined part of said conveyor loop for cooling said castings prior to movement a dump station, and means at said dump station for pivoting each of said buckets while stationary at said dump station to dump said castings after the same have been cooled, said buckets being pivotally mounted on said cars relatively adjacent one side thereof and provided with means disposed generally opposite said pivotal mounting adapted to be engaged by power means located at said dump station for dumping said buckets.

References Cited

UNITED STATES PATENTS

| | | | |
|---|---|---|---|
| 798,833 | 9/1905 | Ruff | 198—135 X |
| 1,795,330 | 3/1931 | Cooke | 62—380 X |
| 2,361,222 | 10/1944 | McBride | 214—64 X |
| 2,760,657 | 8/1956 | Flowers | 214—64 |
| 2,943,726 | 7/1960 | Granath | 198—135 |
| 3,119,488 | 1/1964 | Rabinow | 214—64 X |

FOREIGN PATENTS 972,999  9/1950  France.

EDWARD A. SROKA, *Primary Examiner.*

EVON C. BLUNK, *Examiner.*